J. P. McLean,
Steam-Boiler Attachment.
No 63,073. Patented Mar. 19, 1867.
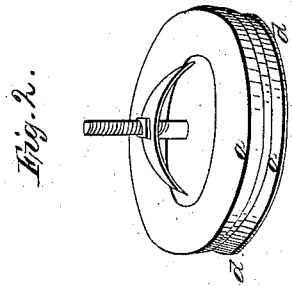
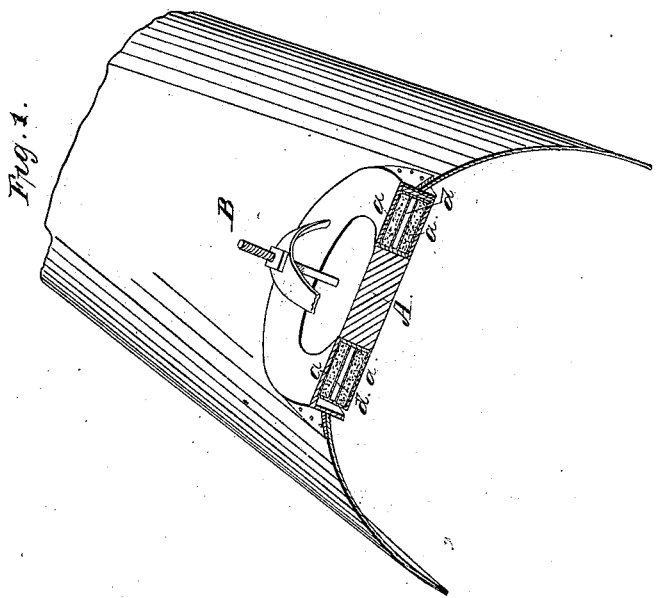
Witnesses:
John Vandercar
J. R. H. Priest
Inventor:
James P. McLean

United States Patent Office.

JAMES P. McLEAN, OF BROOKLYN, NEW YORK.

Letters Patent No. 63,073, dated March 19, 1867.

---

IMPROVEMENT IN PACKING FOR MAN-HOLES OF STEAM GENERATORS.

---

The Schedule referred to in these Letters Patent and making part of the same.

---

TO ALL WHOM IT MAY CONCERN:

Be it known that I, JAMES P. McLEAN, of the city of Brooklyn, in the county of Kings, and State of New York, have made a new and useful Improvement in Packing Man-Holes and Hand-Holes for Steam Boilers, or other places where great heat comes in contact with the gasket; and I hereby declare the following to be a full, clear, and exact description thereof, reference being had to the accompanying drawings, which are lettered to correspond with and form a part of the specification.

In order that the public may fully understand the nature of my invention, and those skilled in the art of manufacture be enabled to construct and use the same, I will describe it as follows, to wit:

Figure 1 is a perspective drawing of a transverse section through the man-hole A of a horizontal steam boiler B, having my improved packing, which improvement is the introduction of cork, $a\ a$, with or without India-rubber diaphragm $d\ d$ between the layers thereof, for the purpose of packing the man-holes and hand-holes of steam boilers, or other similar uses; and in order to protect the said packing against the heat, I coat each piece thereof with asbestos or other non-combustible substance, by which means I am fully convinced that I produce a more perfect and durable packing for the ostensible purpose set forth than any that is in common use.

I believe that layers of cork, $a\ a$, fig. 2, coated with "amianthus" or other varieties of asbestos, or other material, infusible at a common heat, combined with or without the diaphragm $d\ d$, to be new and useful; therefore,

What I claim as novel and useful, and what I wish to secure by Letters Patent of the United States, is—

The cork diaphragm (or rings) or sections thereof, coated with a non-combustible substance, for the purpose substantially as described and shown in the accompanying drawings.

In testimony whereof I hereunto subscribe my name in the presence of two witnesses.

JAMES P. McLEAN.

Witnesses:
    JOHN CURTIS,
    JOHN VANDERCAR.